United States Patent [19]

Blum

[11] Patent Number: 5,624,564

[45] Date of Patent: Apr. 29, 1997

[54] PROCESS FOR DEHYDRATION AND CONCENTRATION OF SEWAGE SLUDGE

[76] Inventor: Holger Blum, Parkallee 75, DE-20144 Hamburg, Germany

[21] Appl. No.: 408,556

[22] Filed: Mar. 21, 1995

[30] Foreign Application Priority Data

Mar. 22, 1994 [DE] Germany ............ 44 09 870.7

[51] Int. Cl.$^6$ ............................................. C02F 11/14
[52] U.S. Cl. ..................... 210/609; 210/610; 210/626; 210/631; 210/728; 210/729
[58] Field of Search .............................. 210/609, 610, 210/611, 626, 631, 725, 727, 728, 729

[56] References Cited

U.S. PATENT DOCUMENTS

| 4,429,043 | 1/1984 | Paton | 435/167 |
|---|---|---|---|
| 4,931,442 | 6/1990 | Blum | 514/249 |
| 4,956,092 | 9/1990 | Blum | 210/609 |
| 5,340,376 | 8/1994 | Cunningham | 71/6 |
| 5,403,488 | 4/1995 | Völsch | 210/614 |

FOREIGN PATENT DOCUMENTS 0319598  6/1989  Germany.

OTHER PUBLICATIONS

Author Ludwig Hartman; reference: ISBN 3-540-50810-4 2.Aufl. Springer-Verlag Berlin Heidelberg New York, untranslated German article, 1989.

Author Professor Dr. Gerhart Drews, Institute of Biology; reference ISBN 3-540-1183605 4.Aufl. Springer-Verlag Berlin Heidelberg New York Tokyo; untranslated German article, 1983.

"A Non-Conventional Solution to an Old Problem," Sharon J. Ostrander, *Operations Forum*, vol. 9, No. 1, Jan., 1992, pp. 10–13.

"dosfolat® XS Provides Sludge Bulking Control at Lower Cost for the Twon of Suffield, CT.," publication by Bioprime, Ltd., P.O. Box 716, 303 Route 5 South, Norwich, VT 05055, 1996.

*Primary Examiner*—Peter A. Hruskoci
*Attorney, Agent, or Firm*—Peters, Verny, Jones & Biksa, L.L.P.

[57] ABSTRACT

In a process for dehydration and concentration of sewage sludge containing activated sludge with the aid of organic and/or inorganic flocculators, the activated sludge content is produced in an aerated biological purification stage in presence of a composition containing a) folic acid and/or dihydrofolic acid or at least one ammonium, alkali metal, alkaline earth metal and/or alkanolammonium salt thereof and b) a water-soluble molybdenum compound, whereby an improved sludge dehydration of the activated sludge content is achieved.

20 Claims, No Drawings

PROCESS FOR DEHYDRATION AND CONCENTRATION OF SEWAGE SLUDGE

BACKGROUND OF THE INVENTION

The invention relates to a process for the concentration and dehydration of sewage sludge, of sewage sludge in particular, which contains activated sludge produced in an aerated biological purification stage.

In industrial and/or local biologically aerobic sewage water purification it is the common desire to produce a compact sewage sludge of easy filtrability and high dry substance content in the filter cake. The reduction of sludge volume accompanying a high dry substance content, due to separation of the sewage water portion, allows for economical and energy-saving further usage of the sewage sludge by storing it on waste dumps, putrefication, combustion or use in agriculture.

Usually, process technological usability of the activated sludge in the sewage treatment plant is determined in that a sample is taken from the activated pond and the precipitation volume thereof is visually judged in the measuring cylinder.

The goal to be achieved in any biological sewage treatment plant always is a precipitation volume being as low as possible, of the activated sludge. This facilitates the process technology to be applied for clarification, since low sludge precipitation volumes always are equivalent to low consumption of inorganic and/or organic flocculators.

With respect thereto, from EP-A-0 355 189 an improved procedure for concentrating and dehydrating sewage sludge using reduced amounts of organic and/or inorganic flocculators is known, so that in an aerated biological purification stage using a water-soluble preparation which contains folic acid and/or dihydrofolic acid and/or at least one ammonium, alkali metal, alkaline earth metal and/or alkanol ammonium salts thereof, an activated sludge with quick precipitation having low precipitation volume is produced.

The kind of procedure under EP-A-0 355 189 has already been introduced into practice successfully (S. J. Ostrander in: Operations Forum, vol. 9, no. 1, 1992, pages 10 to 13).

Stable folic acid compositions are described in EP-A-0 319 598, too.

It is, however, a disadvantage of the procedural method of this patent that the effect of the improved sludge dehydration of the activated sludge ocurrs with temporal delay. Generally, several weeks of fore-runnings in adding folic acid/dihydrofolic acid are required before the effect occurs.

If the waste water originating from the pre-purification and entering the biological purification stage moreover in addition contains toxic substances, the beginning of the improved precipitation behavior of the activated sludge under the method of EP-A-0 355 189 is deferred to about 60 to more than 120 operating days.

In laboratory tests a fore-running period of 5 to 10 days could be achieved, therein, however, no toxic matter usually always contained in the waste water flowing into the activated pond having been added.

For this reason it was tried to shorten the period up to the starting of the improved precipitation behavior by means of increased added amounts of the preparation as defined in the above-stated Letters Patent. The results obtained, however, were not satisfactory and the economy of the procedural method was not guaranteed due to the high dosing of folic acid and/or dihydrofolic acid.

The use of water-soluble molybdenum compounds as micronutrients and as additives for nutrient substrates is known in biotechnology, e.g. from G. Drews: "Mikrobiologisches Praktikum", Berlin 1983, page 11.

U.S. Pat. No. 4,429,043 teaches the use of water-soluble molybdenum compounds as micronutrients, in addition to iron and copper, for an anearobic sewage sludge treatment for preparation of methane gas. In this anaerobic process the sewage sludge, however, is not produced in the presence of folic acid and/or dihydrofolic acid. Nor is there any hint towards to an improved precipitation behavior of the digested sludge.

It is known to the expert in the field of sewage plant technology that the sewage water flowing into the biological purification stage already may contain up to 0.02 ppm of molybdenum in dissolved form, without a synergetic effect on the precipitation behavior of the activated sludge being known when carrying out the process as described in the patent specification of EP-A-0 355 189 (see also L. Hartmann, "Biologische Abwasserreinigung", Berlin 1989, page 188).

Tests in which in two separate partial streams, on one hand folic acid compounds and on the other hand water-soluble molybdenum compounds were added to the waste water flowing into the biological purification stage did not produce results, i.e. a significant reduction of response time up to the start of improved precipitation behavior of the activated sludge could not be achieved, even when large amounts of folic acid and molybdenum were added in separated partial streams.

SUMMARY OF THE INVENTION

It is, therefore, the object of The present invention to provide a process for concentrating and dehydrating sewage sludge, in which process there is no, or only a minor delay of time, between the beginning of the adding of a composition containing folic acid and/or dihydrofolic acid and/or at least one ammonium, alkali metal, alkaline earth metal and/or alkanol ammonium salt thereof, and the beginning of the improved precipitation behavior of the activated sludge treated with said preparation.

The object is now obtained in accordance with the present invention by production of the activated sludge portion of the sewage sludge to be dehydrated in an aerated biological purification stage in the presence of a composition containing a) folic acid and/or dihydrofolic acid or at least one ammonium, alkali metal, alkaline earth metal and/or alkanolammonium salt thereof and b) a water-soluble molybdenum compound.

The method according to the present invention has the advantage that sewage sludge containing activated sludge can be concentrated and dehydrated in an economical manner, without large amounts of folic acid/dihydrofolic acid having to be used in the beginning of treatment.

Furthermore, it is advantageous that, in contrast to the known processes, after a short time from the start a substantial reduction in the amount of inorganic and/or organic flocculators for the treatment of the activated sludge can be carried out, without having to introduce new matter which might be detrimental to the environment, into the circulation of industrial or local waste water clarification.

alkaline earth metal salt solutions or alkanol ammonium salts of the folic acid

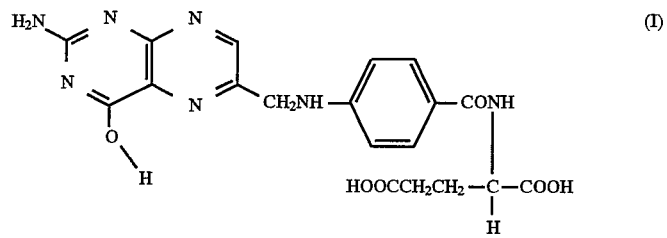

The composition containing folic acid and/or dihydrofolic acid and the salts thereof as well as a water-soluble molybdenum compound is dosed such that the concentration of folic acid and/or dihydrofolic acid and/or the salts thereof amounts to 0.01 to 1 ppm and of molybdenum 0.001 to 0.1 ppm, relative to the amount of sewage water flowing into the biological purification stage.

In the following, preferred embodiments of the invention are elucidated in more detail.

DETAILED ACCOUNT OF WORKING EXAMPLE OF THE INVENTION

In accordance with a preferred embodiment of the invention, continuously approximately 0.01 to 1 ppm folic acid and/or dihydrofolic acid and/or at least one ammonium, alkali metal, alkaline earth metal and/or alkanol ammonium salt thereof as well as additionally a water-soluble molybdenum compound are dosed into the possibly pre-purified waste water flowing into the biological purification step.

Preferably, the dosed-in composition contains approximately 1 mol of water-soluble molybdenum compound per the 2 to 10 mols of folic acid and/or dihydrofolic acid.

After several days of metered addition of the composition in accordance with the present invention the value measured upon 30 minutes, of the precipitation volume of the activated sludge begins to decrease and the amount of inorganic and/or organic flocculators, up until now required in sewage sludge concentration and/or dehydration, respectively, can be reduced step by step, without the precipitation and dehydration behavior of the sewage sludge worsening.

As folic acid, dihydrofolic acid and the salts thereof are slowly dissolving substances, the before-named substances and the salts thereof preferably are dosed into the activated sludge pond in diluted form as clear aqueous solution. The preferred clear aqueous composition further contains clear water-soluble molybdenum compounds.

If the process in accordance with the present invention is carried out by dosingly adding aqueous alkali metal and in an aqueous composition together with water-soluble molybdenum compounds to the activated sludge in the anaerobic biological purification stage or by dehydrating it when mixed with primary sludge, so that due to insufficient stability of the folic acid in aqueous solution a concentration of approximately 0.5 to 3 ppm of folic acid, relative to the waste water flowing into the activated pond, is required for achieving the desired improvement effect in dehydration of the sewage sludge.

If instead of pure folic acid its derivative dihydrofolic acid

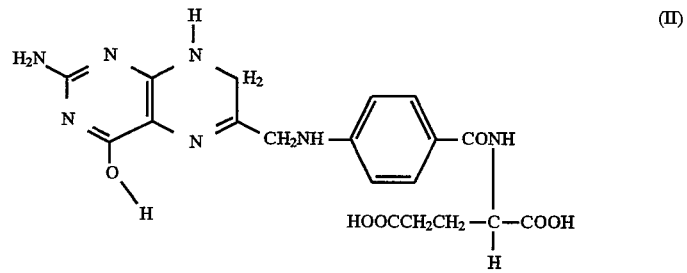

and/or mixtures from folic acid and dihydrofolic acid in the form of a solution of its ammonium, alkali metal, alkaline earth metal or alkanol ammonium salt as components of a composition with water-soluble molybdenum compounds are dosingly added to the activated sludge in the aerobic biological purification stage, then due to the excellent stability of the folic acid/dihydrofolic acid mixture in aqueous solution only a concentration of approximately 0.01 to 0.1 ppm of said folic acid/dihydrofolic acid mixture relative to the waste water flowing into the activated pond is required for achieving the desired improvement effect in dehydration of sewage sludge.

The above-named alkali metal salts are understood to mean lithium, sodium, potassium, rubidium and cesium salts.

The above-named alkaline earth metal salts are understood to mean magnesium, calcium, strontium and barium salts.

The above-named ammonium salts are understood to mean ammonium salts as well as tetraalkylammonium salts having the cation $NH_4^+$ or $NR_4^+$, respectively, wherein R is a low alkyl residue preferably having 1 to 6, in particular 1 to 4, best 1 to 3 carbon atoms.

The alkanol ammonium salt is preferably a salt of the above-named organic acids with a dialkanolamine of the formula:

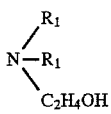

wherein, $R_1$ is hydrogen and/or a hydroxyethylene and/or hydroxypropylene group.

The composition in accordance with the present invention apart from folic acid and/or dihydrofolic acid and/or their salts contains water-soluble molybdenum compounds in form of salts of complex compounds of molybdenum.

Salts of molybdenum are understood to mean for example lithium, sodium, potassium, rubidium, cesium and magnesium salts of molybdic acid $(Me^+)_2MoO_4$ and/or the salts, respectively, of complex multiple-core polymolybdic acids, e.g. of the following formula

wherein $x+y=6$ and $Me^+$ has the following meaning:
a) alkali metal ion
b) alkaline earth metal ion.½
c) ammonium ion as well as tetraalkylammonium ion $NR_4$, wherein R is a low alkali residue preferably having 1 to 6, in particular 1 to 4, best 1 to 3 carbon atoms,
d) alkanolammonium ion prepared by reacting the above-cited polymolybdic acid in water preferably with a dialkanolamin of the formula

wherein $R_1$ is hydrogen and/or a hydroxyethylene and/or hydroxypropylene group.

In accordance with the present invention, the salts of polymolybdic acid of the formula (IV) are used except for containing it in a preferred oxidation step 6+ can partially also contain the molybdenum in a form of lower value, e.g. 5+. These compositions are known to one skilled in the art as so-called "blue polymolybdenic acids".

Under the term of complex compounds of molybdenum there should be named, including for example:
a) oxy-complexes of molybdenum (VI) or (6+) with polycarbon acids like oxalic acid:

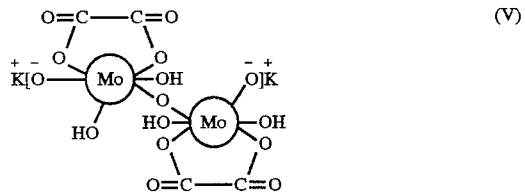

or polyhydroxycarbon acids; e.g. tartaric acid or
b) water-soluble complex compounds of molybdenum including amino acids for example cysteine or aspartic acid, alone or in combination with polyhydroxy compounds for example mono or polysaccarides.

The process in accordance with the present invention now will be explained in more detail by the following examples without, however, being restricted thereto.

EXAMPLE 1

In a local sewage treatment plant the inflow per day of pre-clarified waste water into the activated pond was approximately 2000 m³. The chemical demand for oxygen (COD) in the inflow was approximately 1000 mg/l. The precipitation behavior of the activated sludge was insufficient. A sludge sample of the activated pond of 1000 ml, upon 30 minutes of precipitation time, showed a value of 1000 to 950 ml, i.e. the precipitation behavior was minimum. For maintaining the operational procedural technology 100 kg of solution containing 33 percent by weight of iron(III)chloride were required as flocculator per 1000 m³ of waste water for enforcing precipitation of the activated sludge in the subsequent purification steps.

In accordance with EP-A-0 139 598 an aqueous solution of folic acid, dihydrofolic acid and citric acid was prepared by utilizing a sodium and potassium hydroxide solution (composition A). 100 g of said solution contained 8 mMol of folic acid salt, 8 mMol of dihydrofolic acid salt and 5 mMol of citric acid salt. The above folic acid/dihydrofolic acid composition, after further dilution with tap water in a ratio of 1:100 parts in volume, was added in doses to the activated sludge backflow line of the above sewage treatment plant. The result was an effective dosing concentration of 0.01 ppm of folic acid and 0.01 ppm of dihydrofolic acid in the activated pond. After 4 weeks of dosing with unchanged loading of the activated pond, the value of precipitation volume of the activated sludge, measured after 30 minutes had dropped from 1000 to 950 ml/l down to 350 to 450 ml/l. Simultaneously, the amount of iron(III)chloride solution required could be reduced from 100 kg/1000 m³ to 25 kg/1000 m³.

After 6 weeks of dosingly adding of a composition A of folic acid/dihydrofolic acid solution the process was interrupted. The precipitation volume of the sludge again increased 14 days after the interruption and again reached its original insufficient value of 1000 to 950 ml/l 4 weeks after the interruption of dosingly adding of folic acid/hydrofolic acid solution, so that simultaneously it was necessary to add iron(III)chloride solution in an amount of 100 kg/1000 m³ of waste water.

On the other hand, in accordance with the present invention, an aqueous solution of folic acid, dihydrofolic acid and citric acid as well as molybdenum trioxide was prepared by utilizing sodium and potassium hydroxide solution (composition B). The pH value of said solution was 9.4. 100 g of solution contained 6 mMol of folic acid salt, 6 mMol of dihydrofolic acid salt, 1.5 mMol of molybdic acid salt and 4 mMol of citric acid salt.

The above composition B containing folic acid/dihydrofolic acid as well as molybdic acid salt after further dilution with tap water in a ratio of 1:80 parts in volume was dosingly added into the activated sludge backflow line of the above sewage treatment plant. The result was an effective dosing concentration of 0.01 ppm of folic acid and 0.01 ppm of dihydrofolic acid as well as 0.00054 ppm of molybdenum in the activated pond.

Within as few as 6 days after the dosing period, in accordance with the present invention as defined in composition B with unchanged flow-in load of the activated pond, the value of precipitation volume measured after 30 minutes, of the activated sludge had dropped from 1000 to 950 ml/l down to 350 to 450 ml/l. Simultaneously, the iron(III) chloride solution required for flocculation could be reduced from 100 kg/1000 m³ to 50 kg/1000 m³.

After a total of 21 days for the dosing period of composition B, the value of precipitation volume measured after 30 minutes, of the activated sludge had further dropped to 150 to 200 ml/l. Simultaneously, from that time on the dosingly adding of iron(III)chloride solution was not necessary.

EXAMPLE 2

The tracer analysis of pre-clarified waste water from an industrial sewage plant showed the following amounts of existing heavy metals: iron 1.5 ppm, copper 0.3 ppm, zinc 0.8 ppm and molybdenum 0.05 ppm.

A 1-percent aqueous solution of disodium salt of folic acid was dosingly added into the backflow line of the activated pond of said industrial sewage plant with a capacity per day of 100 m$^3$ of waste water and high sludge burden as well as a COD inflow of 3000 mg/l (Composition C). The effective folic acid concentration relative to the waste water in the activated pond was 1 ppm. After a total of 5 weeks of a dosing period of composition C, the precipitation behavior of the activated sludge still was not sufficient. A sludge sample of 1000 ml from the activated pond showed a value of 800 to 900 ml after 30 minutes of precipitation time.

After the dosing of the 1-percent solution of disodium salt of folic acid was terminated and without interruption a composition (composition D) was dosingly added, said composition being composed as follows:
complex compound of molybdenum prepared by dissolving
  1 mol of molybdic trioxide in 2 mol potassium bitartrate, and
4 mol of monosodium salt of folic acid.
100 g of the composition D contained 2 mMol of folic acid and 0.5 mMol of molybdenum bound as the tartrato complex.

The effective folic acid concentration per m$^3$ of waste water was 0.8 ppm and that of molybdenum was 0.04 ppm.

Only 6 days after adding composition D by doses, the daily value measured after 30 minutes, of the precipitation volume of the activated sludge started dropping significantly and after 14 days reached 300 ml/l and after 21 days 200 to 250 ml/l. The amount of addition of the organic flocculator "Polyacrylate" could then be reduced to 20 percent of the original value without a decrease in the dehydration behavior of the sewage sludge. The volume of sludge to be transferred to the dumping ground was cut down by one half.

EXAMPLE 3 (Comparative Example)

This test was carried out in a highly loaded sewage treatment plant having a quotient of spatial load of activated pond of 0.2 g BOD-5/m$^3$/day per 1 g of activated sludge contained in 1 m$^3$ corresponding to a TOD value of 0.2.

Firstly, for a time of 4 weeks a 1-percent solution of ammonium heptamolybdate $(NH_4)_6Mo_7O_{24}$ (composition E) was dosingly added into the activated pond, so that a concentration of 0.04 ppm of molybdenum relative to the pre-clarified waste water flowing into activation was established in the activated pond. An improvement of the precipitation behavior of the activated sludge (sludge volume after 30 minutes: 400 to 500 ml/l) or a possibility of reducing the flocculator (polyalginate) could not be found during said test period.

Then, after expiry of 4 weeks in addition to the activated pond dose of the ammonium heptamolybdate a composition F containing 8 mMol of folic acid salt, 8 mMol of dihydrofolic acid salt and 5 mMol of citric acid salt per 100 g of an aqueous solution was dosingly added into the activated pond backflow line of the above sewage treatment plant.

The result was an effective dosing concentration of 0.02 ppm of folic acid and 0.02 ppm of dihydrofolic acid in the activated pond. The molybdenum concentration in the activated pond was unchangedly 0.04 ppm. After 4 weeks of a dosing period of both compositions E and F at separate dosing positions with unchanged load of the activated pond, the value measured after 30 minutes, of the precipitation volume of the activated sludge had only slightly dropped from 400 to 500 ml/l down to 350 to 450 ml/l.

EXAMPLE 4

In the sewage treatment plant of example 3, dosing of the composition E was terminated and instead of composition F composition G was dosingly added, containing the following per 100 g:

8 mMol of folic acid, 2 mMol of dihydrofolic acid, 1 mMol of molybdatocysteine salt "[MoO$_3$(Cys)]", 3 mMol of citric acid salt as well as 1 mMol cysteine salt.

Said composition G was pre-diluted with water in a ratio of 1:80 parts in volume and dosingly added into the activated sludge backflow line. The result was an effective concentration of 0.03 ppm of folic acid and 0.0037 ppm of dihydrofolic acid in the activated pond. The molybdynum concentration in the activated pond was 0.0008 ppm.

Only 12 days after the addition of composition G (above) by doses, in accordance with the present invention, the daily value measured after 30 minutes of precipitation time, of the precipitation volume of the activated sludge had dropped to 200 to 250 ml/l. The added amount of the organic flocculator "Polyalginate" used therein could be reduced to approximately 20 percent of the original value without a decrease in the dehydration behavior of the sewage sludge.

What is claimed:

1. An improved process for concentration and dehydration of sewage sludge containing activated sludge, with the aid of organic flocculators, inorganic flocculators, or combinations thereof wherein the activated sludge portion is produced in an aerated biological purification stage, which process comprises:
   A. contacting the activated sludge in said purification stage with an effective amount of a composition comprising:
      a) folic acid, dihydrofolic acid, at least one ammonium salt, alkali metal, alkaline earth metal salt, or alkanolammonium salt of folic acid or of dihydrofolic acid or combinations thereof, and
      b) a water-soluble molybdenum compound to precipitate said activated sludge, and
   B. concentrating and dehydrating said activated sludge.

2. A process as defined in claim 1, wherein said activated sludge portion of the sewage sludge to be dehydrated is produced in an aerated biological purification stage in the presence of
   a) 0.01 to 1 parts by weight per 1 million parts by weight relative to the amount of liquid flowing into the biological purification stage, of folic acid, dihydrofolic acid, at least one ammonium salt, alkali metal salt, alkaline earth metal salt, alkanolammonium salt of folic acid or of dihydrofolic acid or combinations thereof, and
   b) 0.001 to 0.1 parts by weight per 1 million parts by weight relative to the amount of liquid flowing into the biological purification stage, of one or more water-soluble compounds of molybdenum as a component of a composition which also contains folic acid, dihydrofolic acid or combinations thereof.

3. A process as defined in claim 2, wherein the added composition contains approximately 1 Mol of water-soluble molybdenum compound per 2 to 10 Mol of folic acid, dihydrofolic acid or combinations thereof.

4. A process as defined in claim 2, wherein the improved sludge dehydration of the activated sludge occurs without time delay or with only minor time delay.

5. A process as defined in claim 1, wherein the added composition contains approximately 1 Mol of water-soluble molybdenum compound per 2 to 10 Mol of folic acid, dihydrofolic acid or combinations thereof.

6. A process as defined in claim 5, wherein the improved sludge dehydration of the activated sludge occurs without time delay or with only minor time delay.

7. A process as defined in claim 1, wherein the improved sludge dehydration of the activated sludge occurs without time delay or with only minor time delay.

8. The process of claim 1 wherein the soluble molybdenum salt is selected from a polymolybdenum acid salt.

9. The process of claim 1 wherein in step A, folic acid is present.

10. The process of claim 1 wherein dihydrofolic acid is present.

11. An improved process for concentration and dehydration of sewage sludge containing activated sludge, with the aid of organic flocculators, inorganic flocculators or combinations thereof which process comprises:
A. contacting a waste water in an aerated biological purification stage to produce said activated sludge in the presence of a composition consisting essentially of:
   a) at least one compound selected from the group consisting of folic acid, dihydrofolic acid, at least one ammonium salt, alkali metal salt, alkaline earth metal salt, alkanolammonium salt of folic acid or of dihydrofolic acid or combinations thereof, in an amount of between about 0.01 to 1 ppm, based on the amount of liquid flowing into the biological purification stage, and
   b) 1 mol of a water soluble molybdenum compound per 2 to 10 mols of said at least one compound of a) to precipitate said activated sludge, concentrating and dehydrating said activated sludge.

12. A process as defined in claim 11 wherein the added composition contains approximately 1 Mol of water-soluble molybdenum compound per 2 to 10 Mol of folic acid, dihydrofolic acid or combinations thereof.

13. A process as defined in claim 12, wherein the added composition contains approximately 1 Mol of water-soluble molybdenum compound per 2 to 10 Mol of folic acid.

14. A process as defined in claim 13, wherein the improved sludge dehydration of the activated sludge occurs without time delay or with only minor time delay.

15. A process as defined in claim 12, wherein the improved sludge dehydration of the activated sludge occurs without time delay or with only minor time delay.

16. A process as defined in claim 11, wherein the improved sludge dehydration of the activated sludge occurs without time delay or with only minor time delay.

17. The process of claim 11 wherein the soluble molybdenum salt is selected from a polymolybdenum acid salt.

18. The process of claim 11 wherein folic acid is present.

19. The process of claim 11 wherein dihydrofolic acid is present.

20. The process of claim 11 wherein in step A the soluble molybdenum salt is selected from a polymolybdenum acid salt of an alkali metal, an alkaline earth metal, ammonia, an alkanolamine, organic acids having polycarboxylic acid groups, or an amino acid and folic acid is present.

* * * * *